United States Patent Office 3,132,159
Patented May 5, 1964

3,132,159
p-AMINOPHENYL MALONONITRILE AND 3-DIAZO - 6 - DICYANOMETHYLENECYCLO-HEXA-1,4-DIENE
Harris D. Hartzler, Wilmington, Del., assignor to E. I. du Pont de Nemours and Company, Wilmington, Del., a corporation of Delaware
No Drawing. Filed July 2, 1962, Ser. No. 207,008
9 Claims. (Cl. 260—396)

This invention relates to new polycyano compounds. More specifically, the invention relates to p-aminophenylmalononitrile and to the diazo compound derived therefrom, i.e., 3-diazo-6-dicyanomethylenecyclohexa-1,4-diene. These compounds have the structural formulas

and

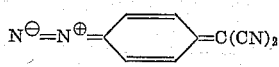

respectively.

It will be observed that the "diazo" substituent here is $N^{\ominus}{=}N^{\oplus}{=}$ rather than the normal —N:N— or N:N= or the related "diazonium," $N^{+}(:N)$—. Despite this structural difference no other term has been found in listed, accepted, official or semi-official nomenclature to more properly describe the grouping involved. Accordingly, the "diazo" terminology will be used hereinafter, with the above structural difference understood, to describe this unique compound.

p-Aminophenylmalononitrile is most conveniently prepared by the reduction of p-nitrophenylmalononitrile. The reduction can be carried out either chemically or catalytically with hydrogen. The preferred technique is catalytic hydrogenation at temperatures in the range 0° to 100° C. and hydrogen pressures in the range of 1–10 atmospheres using a Raney nickel catalyst, usually in the presence of an organic reaction medium. Suitable media are polar solvents in which the nitro compound is soluble, e.g., acetone, acetonitrile, ethyl acetate, the dimethyl ether of ethylene glycol, the dimethyl ether of diethylene glycol, and the like.

The starting p-nitrophenylmalononitrile can be made from p-bromonitrobenzene and salts of malononitrile or, more desirably, by condensation of cyanogen chloride or bromide with p-nitrophenylacetonitrile in the presence of a suitable base. The latter condensation is carried out in solvents such as tetrahydrofuran or the dimethyl ether of ethylene glycol, in the presence of a base such as sodium hydride or an alkali metal alkoxide, and at temperatures from 0° C. to the boiling point of the reaction medium. The reaction of p-bromonitrobenzene with salts, e.g., the sodium salt of malononitrile, normally is carried out at elevated temperatures, i.e., in the range 120° C. or thereabouts, and in a suitable reaction medium, e.g., dimethylformamide, dimethylacetamide, or the dimethyl ether of ethylene glycol. The reaction medium, or solvent, should be polar but aprotic.

3-diazo-6-dicyanomethylenecyclohexa-1,4-diene can be prepared from p-aminophenylmalononitrile by diazotization procedures, e.g., using nitrous acid, preferably as obtained from sodium nitrite and a mineral acid. The diazotization will be carried out under more or less conventional techniques, except that much stronger acids will be used than normally. The amine compound is insoluble, even in concentrated sulfuric acid, and the diazotizations are effected therefore in heterogeneous systems. The diazotizations will normally be run at from −10° to +10° C. Aqueous systems appear necessary in order to insure the insolubility of the diazo product. The diazo compound in solution in aqueous alcohol is destroyed with a half-life less than two hours.

The following examples, in which the parts given are by weight, are submitted to illustrate further the present invention but not to limit it.

EXAMPLE I

Part A.—Preparation of p-Nitrophenylmalononitrile

A slurry of 92 parts of a 50% by weight dispersion of sodium hydride in mineral oil and 890 parts of tetrahydrofuran was stirred under nitrogen, cooled in an ice bath, and 162 parts (0.5 molar based on hydride) of p-nitrophenylacetonitrile was added in small portions over a period of ten to twenty minutes. Hydrogen was evolved and the solution became dark red. A slight molar excess (70 parts, 1.15 molar based on the nitrile) of cyanogen chloride was passed into the reaction mixture at a rate such that the reaction temperature was maintained under 40° C. The addition required about 2 hours. The color of the reaction mixture deepened and more hydrogen was evolved. The mixture was stirred overnight at room temperature under a nitrogen atmosphere, then cooled in an ice/water bath, and poured into 336 parts of iced 6 N aqueous hydrochloric acid. A dark, oily solid resulted. The tetrahydrofuran was removed from the mixture by distillation under reduced pressure, and the resultant dark solid was isolated by filtration. The crude material was dried and recrystallized from a 2/1 by volume mixture of benzene/n-heptane. After filtration and drying, there was thus obtained 148 parts (79.4% of theory) of p-nitrophenylmalononitrile as pale yellow plates melting at 108–109.4° C. The product is a very strong acid exhibiting a $pK_a$ of 1.89. Another sample of the same product, prepared in essentially the same manner, exhibited a melting point of 109–110° C.

Analysis.—Calcd. for $C_9H_5N_3O_2$: C, 57.8%; H, 2.7%; N, 22.4%. Found: C, 58.2%; H, 3.0%; N, 22.3%, 22.6%.

Part B.—Preparation of p-Aminophenylmalononitrile

A mixture of 14.0 parts of the above p-nitrophenylmalononitrile in about 70 parts of acetone and about five added parts of a commercially available Raney nickel catalyst was shaken at room temperature in a pressure hydrogenation apparatus for 1.5 hours under 40 p.s.i. gauge hydrogen pressure. Hydrogen absorption ceased after approximately 90% of the theoretical absorption. The hydrogenation vessel was bled to the atmosphere, opened, and the mixture removed. The catalyst was removed by filtration and the acetone filtrate was concentrated to approximately one tenth of the original volume. The solid product was removed by filtration, and there was thus obtained 8.74 parts of the crude p-aminophenylmalononitrile. Recrystallization from a 1/1 by volume ethanol/water mixture, followed by filtration and drying, afforded 6.11 parts (52% of theory) of the pure p-aminophenylmalononitrile as crystals melting at 135–136° C.

Analysis.—Calcd. for $C_9H_7N_3$: C, 68.8%; H, 4.5%; N, 26.7%. Found: C, 68.8%; H, 4.7%; N, 26.1%.

EXAMPLE II

Preparation of 3-Diazo-6-Dicyanomethylenecyclohexa-1,4-Diene

A slurry of 12.3 parts of the above p-aminophenylmalononitrile, 55 parts of aqueous 6 N hydrochloric acid solution, and 130 parts of ice was paddle-stirred in an open glass reactor and a cold solution of 8.0 parts of sodium nitrite in 60 parts of water was added over a five-minute period. The resultant reaction mixture was stirred for an additional ten minutes and the solid product then removed by filtration. On drying, there was thus obtained 11.3 parts (84% of theory) of 3-diazo-6-dicyanomethylenecyclohexa-1,4-diene as a red-brown solid exhibiting no clean-cut melting point but decomposing at 115° C. with release of gas when immersed in a preheated melting point bath.

*Analysis.*—Calcd. for $C_9H_4N_4$: C, 64.3%; H, 2.4%. Found: C, 64.0%; H, 3.3%.

Another sample similarly prepared was analyzed for nitrogen.

Calcd. for $C_9H_4N_4$: N, 33.3%. Found: N, 32.3%.

3-diazo-6-dicyanomethylenecyclohexa-1,4-diene is useful as an initiator for the polymerization of addition-polymerizable, ethylenically unsaturated monomers. The addition polymerization-initiating activity of this compound can be triggered by light or heat or both and is most effective in the range 50° to 115° C. Thus to illustrate, a mixture of 0.2 part of 3-diazo-6-dicyanomethylenecyclohexa-1,4-diene and 450 parts of freshly distilled styrene monomer was stirred and irradiated with a commercially available, transformerless sunlamp. After five minutes under these conditions, the liquid styrene became very viscous and after five more minutes under the same conditions, had set to a nonpourable, heavy gel. A control without the added diazodicyanomethylenecyclohexadiene initiator was still a free-flowing, nonviscous liquid at the end of the ten-minute time.

p-Aminophenylmalononitrile from which th diazodicyanomethylenecyclohexadiene is prepared, in addition to being obviously useful in preparing the latter compound, is also useful as an uncoupler for biological oxidative phosphorylation. In this well-recognized test p-aminophenylmalononitrile is semi-quantitatively as effective as 2,4-dinitrophenol, which is accepted as a highly effective uncoupler of oxidative phosphorylation.

During the course of normal respiration, electrons are removed from substrate molecules (i.e., foodstuffs) and passed through a chain of electron carriers to molecular oxygen. Coupled to the electron transport is the esterification of inorganic phosphate and adenosine diphosphate to yield adenosine triphosphate. This process is called oxidative phosphorylation, and mitrochondria are the sites thereof. Adenosine triphosphate is the molecule used by living systems to supply the energy for vital processes.

Some compounds, such as 2,4-dinitrophenol, will uncouple the synthesis of adenosine triphosphate from electron transport—see Racker, Advances in Enzomology 23, 364 (1961). Thus, when mitochondria are isolated from living tissues and treated with 2,4-dinitrophenol at concentrations of from $1\times10^{-4}$ to $1\times10^{-5}$ M, oxidative phosphorylation is uncoupled and adenosive triphosphate is not synthesized during respiratory electron transport—see page 151, "Data for Biochemical Research," Oxford, Clarendon Press, 1959. More quantitatively, when mitochondria isolated from beef heart by the standard method of Green, Advances in Enzomology 21, 78 (1959), are treated with $6.22\times10^{-5}$ M quantities of p-aminophenylmalononitrile, oxidative phosphorylation is uncoupled as measured by a 63% inhibition of phosphate uptake per molecule of oxygen consumed. For comparative purposes, 2,4-dinitrophenol at the indicated concentrations of $1\times10^{-4}$ to $1\times10^{-5}$ M exhibits about a 50% inhibition.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Polycyano compounds selected from the class consisting of p-aminophenylmalononitrile and 3-diazo-6-dicyanomethylenecyclohexa-1,4-diene.

2. The compound of the formula

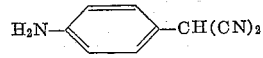

3. The compound of the formula

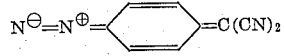

4. Process which comprises reducing p-nitrophenylmalononitrile and recovering the resultant p-aminophenylmalononitrile.

5. Process which comprises catalytically hydrogenating p-nitrophenylmalononitrile and recovering the resultant p-aminophenylmalononitrile.

6. Process which comprises reacting, in the presence of Raney nickel catalyst, p-nitrophenylmalononitrile with hydrogen and recovering the resultant p-aminophenylmalononitrile.

7. Process which comprises diazotizing, in an aqueous system and in the presence of a strong acid, p-aminophenylmalonitrile and recovering the resultant compound of the formula

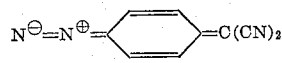

8. Process which comprises adding aqueous sodium nitrite to an aqueous solution of p-aminophenylmalonitrile and hydrochloric acid and recovering the resultant compound of the formula

9. Process which comprises reacting a cyanogen halide of the class consisting of cyanogen chloride and cyanogen bromide with p-nitrophenylacetonitrile to produce p-nitrophenylmalononitrile, reducing said p-nitrophenylmalononitrile to produce p-aminophenylmalonitrile, diazotizing, in an aqueous system and in the presence of a strong acid, said p-aminophenylmalononitrile and recovering the resultant compound of the formula

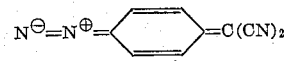

No references cited.